United States Patent
Jung et al.

(10) Patent No.: US 9,842,276 B2
(45) Date of Patent: Dec. 12, 2017

(54) SYSTEM AND METHOD FOR ANALYZING PERSONALIZED CHARACTERISTICS

(71) Applicant: SAMSUNG SDS CO., LTD., Seoul (KR)

(72) Inventors: Min-Woo Jung, Yongin-si (KR); Hyun-Jung Soh, Seongnam-si (KR); Hye-Ran Lee, Seoul (KR); Tae-Hwan Jeong, Seoul (KR); Hyun-Chul Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 52 days.

(21) Appl. No.: 14/979,876

(22) Filed: Dec. 28, 2015

(65) Prior Publication Data

US 2017/0124423 A1     May 4, 2017

(30) Foreign Application Priority Data

Oct. 29, 2015     (KR) ........................ 10-2015-0151041

(51) Int. Cl.
    *G06K 9/00*          (2006.01)
    *G06K 9/62*          (2006.01)
               (Continued)

(52) U.S. Cl.
    CPC ........... *G06K 9/62* (2013.01); *G06K 9/00771* (2013.01); *G06K 9/03* (2013.01); *G06K 9/2054* (2013.01); *G06K 9/46* (2013.01); *G06K 9/78* (2013.01)

(58) Field of Classification Search
    CPC ........... G06K 9/00221; G06K 9/00228; G06K 9/00248; G06K 9/00255; G06K 9/00261;
               (Continued)

(56) References Cited

U.S. PATENT DOCUMENTS 6,072,903 A * 6/2000 Maki ....................... G06T 7/251
                                                    348/169
7,397,931 B2 * 7/2008 Imagawa ........... G06K 9/00335
                                                    382/103

(Continued)

FOREIGN PATENT DOCUMENTS

KR    10-2013-0139152 A    12/2013
KR    10-2015-0017055 A    2/2015

(Continued)

OTHER PUBLICATIONS

Communication dated Oct. 21, 2016 issued by the Korean Intellectual Property Office in Korean Patent Application No. 10-2015-0151041.

*Primary Examiner* — Jose Couso (74) *Attorney, Agent, or Firm* — Sughrue Mion, PLLC (57) ABSTRACT

A system and method for analyzing a personalized characteristic are provided. The system includes an analysis range calculator configured to calculate a plurality of analysis ranges having different analysis times from positioning data according to a lapse of time of an analysis target; an image analyzer configured to identify one or more objects from the image data corresponding to each of the analysis ranges, and analyze one or more visual characteristics from each of the identified objects; and a characteristic analyzer configured to generate personalized characteristic information of the analysis target using a characteristic analysis result of each of the analysis ranges.

15 Claims, 8 Drawing Sheets

(51) Int. Cl.
*G06K 9/03* (2006.01)
*G06K 9/46* (2006.01)
*G06K 9/78* (2006.01)
*G06K 9/20* (2006.01)

(58) Field of Classification Search
CPC ........... G06K 9/00268; G06K 9/00275; G06K 9/00281; G06K 9/00288; G06K 9/00295; G06K 9/00302; G06K 9/00308; G06K 9/00315; G06K 9/00335; G06K 9/00342; G06K 9/00348; G06K 9/00355; G06K 9/00362; G06K 9/00369; G06K 9/00375; G06K 9/00382; G06K 9/00389; G06K 9/00671; G06K 9/00771; G06K 9/03; G06K 9/46; G06K 9/62; G06K 9/6202; G06K 9/6217; G06K 9/6234; G06K 9/6267; G06K 2009/00328; G06K 2009/00395; G06K 2009/27; G06K 2009/6213; G06T 7/292; G06T 7/41; G06T 2207/30196–2207/30201; G06T 2207/30232; G06T 2207/30241; H04N 5/23219; H04N 7/18–7/188; H04N 21/23418; H04N 21/4223; H04N 21/44008; H04N 21/440218; H04N 21/4532; G06F 17/3079–17/30793; A61B 5/117; A61B 5/1171; A61B 5/1176; G06Q 10/10; G06Q 30/02; G06Q 30/0239; G06Q 30/0245; G06Q 30/0276; G06Q 30/0277

See application file for complete search history.

(56) References Cited

U.S. PATENT DOCUMENTS

| | | | |
|---|---|---|---|
| 9,239,965 | B2 | 1/2016 | Yang |
| 2012/0128209 | A1* | 5/2012 | Sakimura .................. G06T 7/20 382/103 |
| 2015/0125073 | A1 | 5/2015 | Hwang et al. |
| 2015/0325004 | A1* | 11/2015 | Utsunomiya .......... A61B 5/742 382/103 |
| 2016/0092739 | A1* | 3/2016 | Oami .................. G06K 9/00771 348/159 |
| 2016/0284098 | A1* | 9/2016 | Okumura ................. G06K 9/46 |

FOREIGN PATENT DOCUMENTS

| | | |
|---|---|---|
| KR | 10-2015-0028589 A | 3/2015 |
| KR | 10-2015-0034925 A | 4/2015 |
| KR | 10-2015-0052924 A | 5/2015 |

* cited by examiner

SYSTEM AND METHOD FOR ANALYZING PERSONALIZED CHARACTERISTICS

CROSS-REFERENCE TO RELATED APPLICATION

This application claims priority to and the benefit of Korean Patent Application No. 10-2015-0151041, filed on Oct. 29, 2015, the disclosure of which is incorporated herein by reference in its entirety.

BACKGROUND

1. Field

Exemplary embodiments of the present disclosure relate to technology for analyzing a personalized characteristic of an analysis target through a combined analysis of positioning data and image data.

2. Discussion of Related Art

Recently, many studies on collecting data of a user and recognizing a personalized characteristic of the user from the collected data in various fields have been performed. For example, various methods for providing customized information or marketing using personalized information of users, such as a method of inducing customers visiting a specific store to sign up for a membership, a method of analyzing a purchase characteristic according to age, sex, etc. based on information input when signing up for the membership, or a method of recognizing a store which an analysis target frequently visits using measurement data for each customer, etc., have been studied.

However, since conventional technologies are configured to derive a personalized characteristic by simply depending on only one kind of data such as positioning data, image data, etc., there has been a limitation in order to recognize various characteristics of the analysis target.

SUMMARY

Embodiments of the present disclosure are directed to a means for analyzing various characteristics of an analysis target through a combined analysis of positioning data and image data of the analysis target.

According to one aspect of the present disclosure, there is provided a system for analyzing a personalized characteristic, including an analysis range calculator configured to calculate a plurality of analysis ranges having different analysis times from positioning data according to lapse of time of an analysis target; an image analyzer configured to identify one or more objects from image data corresponding to each of the analysis ranges, and analyze one or more visual characteristics from each of the identified objects; and a characteristic analyzer configured to generate personalized characteristic information of the analysis target using a characteristic analysis result of each of the analysis ranges.

The analysis range calculator may calculate the analysis range by considering an error characteristic of a positioning means generating the positioning data.

The analysis range calculator may calculate the analysis range by additionally considering a characteristic of a space corresponding to the positioning data.

The image analyzer may calculate reliability of the characteristic analysis result of each of the analysis ranges.

The reliability may be calculated using the number of all personal identifiers which are within each analysis range, and the number of objects identified from the image data of each of the analysis ranges.

The characteristic analyzer may select one or more characteristic zones among the analysis ranges using the reliability, and generate the personalized characteristic information of the analysis target from the characteristic analysis result corresponding to each of the characteristic zones.

The characteristic analyzer may select an analysis range in which the reliability is equal to or more than a predetermined value among the analysis ranges as the characteristic zone.

The characteristic analyzer may set a common characteristic of the analysis target derived from at least one portion of the characteristic analysis result of each of the characteristic zones as a personalized characteristic of the analysis target.

The characteristic analyzer may recalculate the common characteristic by increasing the number of the characteristic analysis results of each of the characteristic zones used to derive the common characteristic when a probability value corresponding to the derived common characteristic does not satisfy a reference value.

According to another aspect of the present disclosure, there is provided a method for analyzing a personalized characteristic, including calculating a plurality of analysis ranges having different analysis times from positioning data according to lapse of time of an analysis target; identifying one or more objects from image data corresponding to each of the analysis ranges, and analyzing one or more visual characteristics from each of the identified objects; and generating personalized characteristic information of the analysis target using a characteristic analysis result of each of the analysis ranges.

The calculating of the plurality of analysis ranges may calculate the analysis range by considering an error characteristic of a positioning means generating the positioning data.

The calculating of the plurality of analysis ranges may calculate the analysis range by additionally considering a characteristic of a space corresponding to the positioning data.

The analyzing of the one or more visual characteristics may further include calculating reliability of the characteristic analysis result of each of the analysis ranges.

The reliability may be calculated using the number of all personal identifiers within each of the analysis ranges, and the number of objects identified from the image data of each of the analysis ranges.

The generating of the personalized characteristic information may select one or more characteristic zones among the analysis ranges using the reliability, and generate the personalized characteristic information of the analysis target from the characteristic analysis result corresponding to each of the characteristic zones.

The generating of the personalized characteristic information may select an analysis range in which the reliability is equal to or more than a predetermined value among the analysis ranges as the characteristic zone.

The generating of the personalized characteristic information may set a common characteristic of the analysis target derived from at least one portion of the characteristic analysis result of each of the characteristic zones as a personalized characteristic of the analysis target.

The generating of the personalized characteristic information may recalculate the common characteristic by increasing the number of the characteristic analysis results of each of the characteristic zones used to derive the common characteristic when a probability value corresponding to the derived common characteristic does not satisfy a reference value.

According to still another aspect of the present disclosure, there is provided a computer program stored in a computer-readable recording medium for executing a method in combination with hardware, the method including calculating a plurality of analysis ranges having different analysis times from positioning data according to lapse of time of an analysis target; identifying one or more objects from image data corresponding to each of the analysis ranges, and analyzing one or more visual characteristics from each of the identified objects; and generating personalized characteristic information of the analysis target using a characteristic analysis result of each of the analysis ranges.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described with reference to the accompanying drawings. The following description is provided in order to provide a comprehensive understanding with respect to a method, apparatus, or system described herein or all of them. However, it is merely an example, and is not limited thereto.

In the following descriptions of the exemplary embodiments of the present disclosure, when it is determined that a detailed description of a well-known technology related to the present disclosure can unnecessarily obscure a subject matter of the present disclosure, the description will be omitted. All terms used herein are terms defined by considering functions in the present disclosure, and may be different according to intentions or customs of a user or an operator. Accordingly, the terms should be defined based on the description of this specification. The terms used herein are only for describing exemplary embodiments according to the present disclosure, and should not be interpreted to limit it. Unless otherwise defined, the use of the singular form in the present document should not preclude the presence of more than one referent. It will be further understood that the terms "comprises," "comprising," "includes," and/or "including," when used herein, specify the presence of stated features, items, steps, operations, elements, components, or all or a part of them, but do not preclude the presence or addition of one or more other features, items, steps, operations, elements, components, or groups thereof or all of them.

Figure 1:
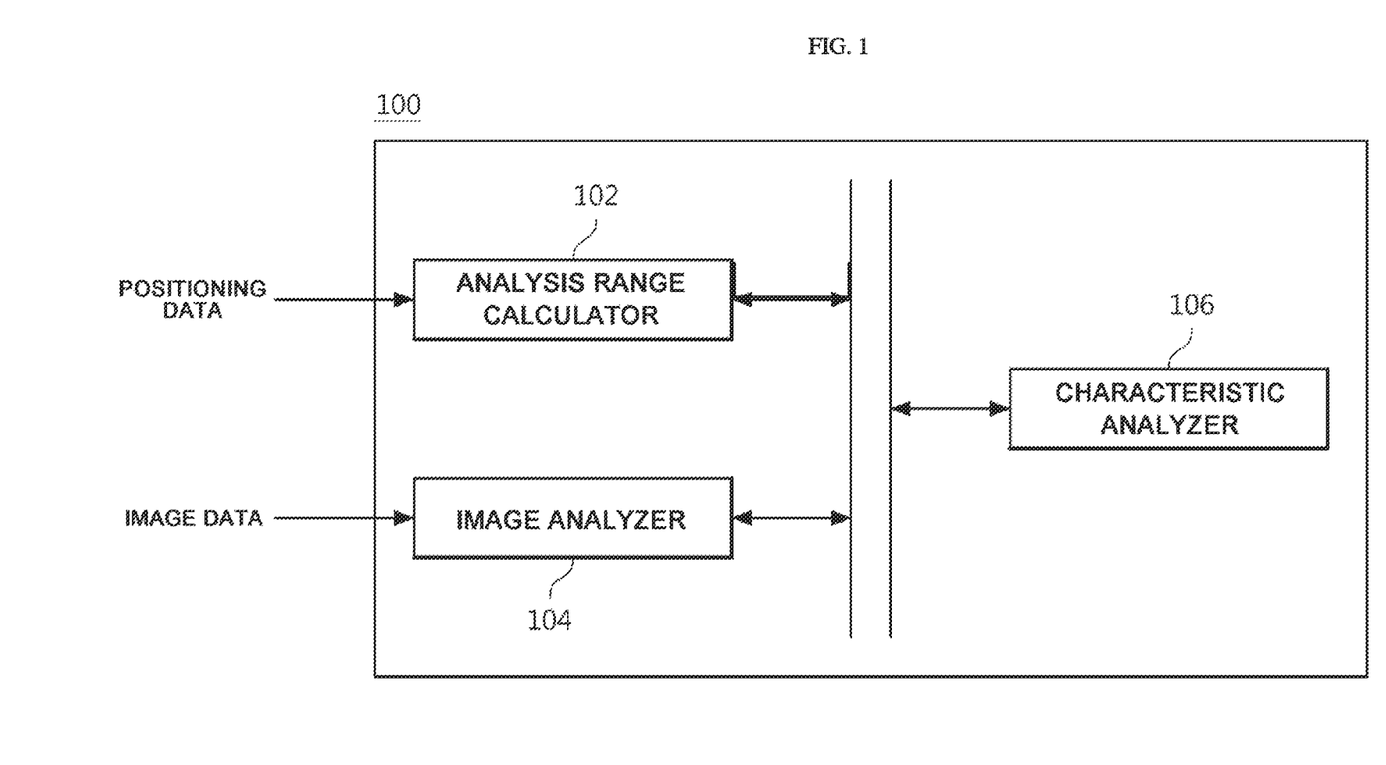
FIG. 1 is a block diagram illustrating a configuration of a system for analyzing a personalized characteristic according to an exemplary embodiment of the present disclosure.

FIG. 1 is a block diagram illustrating a configuration of a personalized characteristic analysis system 100 according to an exemplary embodiment of the present disclosure. The personalized characteristic analysis system 100 according to an exemplary embodiment of the present disclosure includes an analysis range calculator 102, an image analyzer 104, and a characteristic analyzer 106. In one exemplary embodiment, the personalized characteristic analysis system 100 including the analysis range calculator 102, the image analyzer 104, and the characteristic analyzer 106 may be implemented in a computing device including one or more processors and a computer-readable recording (storage) medium connected to the processors. The computer-readable recording (storage) medium may be located inside or outside the processors, and be connected to the processors by various means which are well known. The processor inside the computing device may allow each computing device to operate according to an exemplary embodiment which will be described herein. For example, the processor may execute an instruction stored in the computer-readable recording (storage) medium, and when the instruction stored in the computer-readable recording (storage) medium is executed by the processor, the processor may be configured to allow the computing device to operate according to the exemplary embodiment which will be described herein.

The analysis range calculator 102 calculates a plurality of analysis ranges having different analysis times from positioning data according to the lapse of time of an analysis target. In one exemplary embodiment, the analysis target may be a person possessing a predetermined personal identification means. For example, the analysis target may be a person moving while possessing a personal mobile device (for example, a smart phone, a tablet computer, a wearable device, etc.) in a specific region (for example, a shopping mall or a department store, the premises of a company, etc.). The personal mobile device may periodically measure its own position using various means such as a global positioning system (GPS), pedestrian dead reckoning (PDR), wireless communication (Wi-Fi, or a mobile communication network), or a local area communication means (Bluetooth, Zigbee, etc.), etc.

The analysis range calculator 102 identifies the analysis target from the positioning data of each time collected from a plurality of users, and calculates the analysis range from the identified analysis target. In one exemplary embodiment, the personalized characteristic analysis system 100 may include a separate positioning database (not shown), and the positioning database may be configured to store and manage positioning data of each time collected from the plurality of users. The positioning database may be configured to collect position data of each user from the personal mobile device possessed by the plurality of users. In another exemplary embodiment, the personalized characteristic analysis system 100 may be configured to receive the positioning data from an external positioning database by connecting to the external positioning database through a wired or wireless network.

Figure 2:
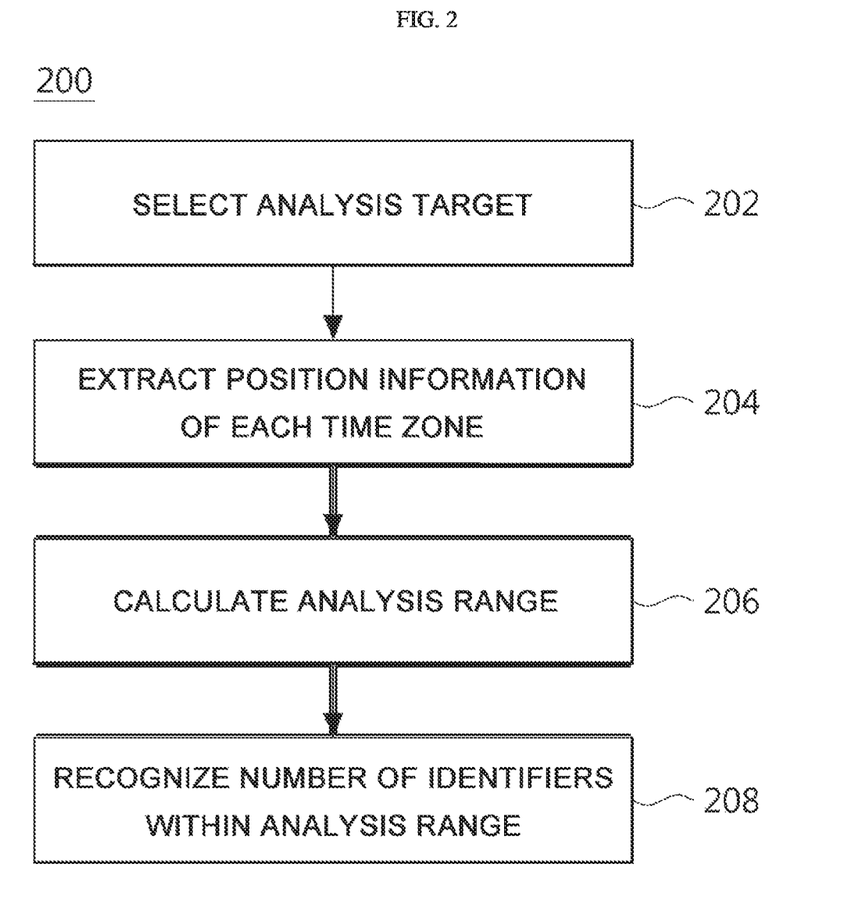
FIG. 2 is a flowchart for describing an analysis range calculation process of an analysis range calculator according to an exemplary embodiment of the present disclosure.

FIG. 2 is a flowchart for describing an analysis range calculation process 200 of the analysis range calculator 102 according to an exemplary embodiment of the present disclosure. In the flowchart shown in this specification, the process is described by being divided into a plurality of steps, but at least one step of the process may be performed by changing the order, be performed by being combined with another steps, be omitted, be performed by being divided into sub-steps, or be performed by adding one or more steps which are not shown.

In step 202, the analysis range calculator 102 may select an analysis target for a characteristic analysis. In exemplary embodiments of the present disclosure, the analysis target may be specified as an identifier of a personal mobile device possessed by users, for example, a mobile telephone number, a universally unique identifier (UUID) of an application installed in the personal mobile device, or an ID registered by the users, etc. However, it is not limited to a specific kind of identification information, etc. in exemplary embodiments of the present disclosure, every kind of information which is usable for identifying each of the plurality of users may be used without limitation.

In step 204, the analysis range calculator 102 may extract position information of each time from positioning data of the analysis target. In an exemplary embodiment, the positioning data may include position information collected from a plurality of users and a collection time of each piece of the position information. The analysis range calculator 102 may extract positioning data of the analysis target from the positioning data, and extract the position information of each of the plurality of times from the extracted positioning data.

Figure 3:
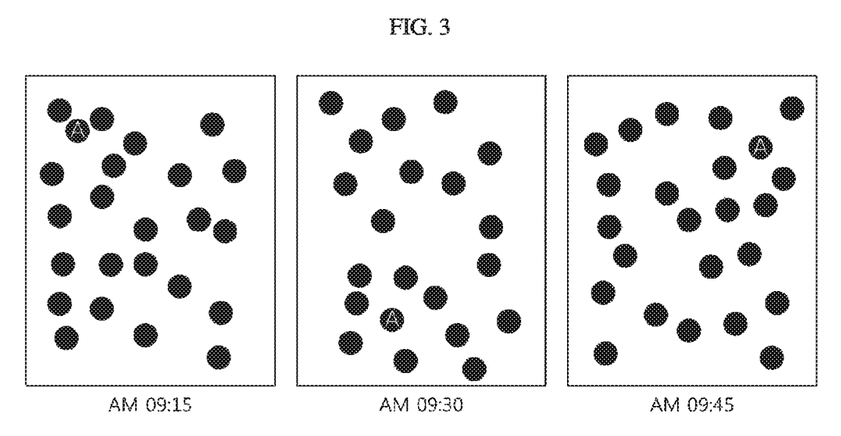
FIG. 3 is a diagram for describing an example of extracting position information of an analysis target by the analysis range calculator according to an exemplary embodiment of the present disclosure.

FIG. 3 is a diagram for describing an example of extracting position information of an analysis target by the analysis range calculator 102 according to an exemplary embodiment of the present disclosure. In the exemplary embodiment which is shown, position information of an analysis target A of each of three times including 9:15 a.m., 9:30 a.m., and 9:45 a.m. is shown together with position information of another user.

In step 206, the analysis range calculator 102 may calculate a plurality of analysis ranges from the extracted position information of each time.

In an exemplary embodiment, the analysis range calculator 102 may calculate the analysis range by considering an error characteristic of a positioning means generating the positioning data. For example, when the positioning data is generated by using a GPS as a positioning means, the analysis range calculator 102 may calculate the analysis range by considering an error which may be generated according to a characteristic of a GPS signal. For another example, when the positioning data is generated by using the PDR as the positioning means, the analysis range calculator 102 may calculate the analysis range by considering an error characteristic of an acceleration sensor, etc.

The analysis range calculator 102 may calculate the analysis range by additionally considering a characteristic of a space corresponding to the positioning data. For example, when a portion of the space corresponding to extracted position information is blocked by a wall, etc., or movement of the analysis target is limited for other reasons, the analysis range calculator 102 may exclude a corresponding region from the analysis range.

Figure 4:
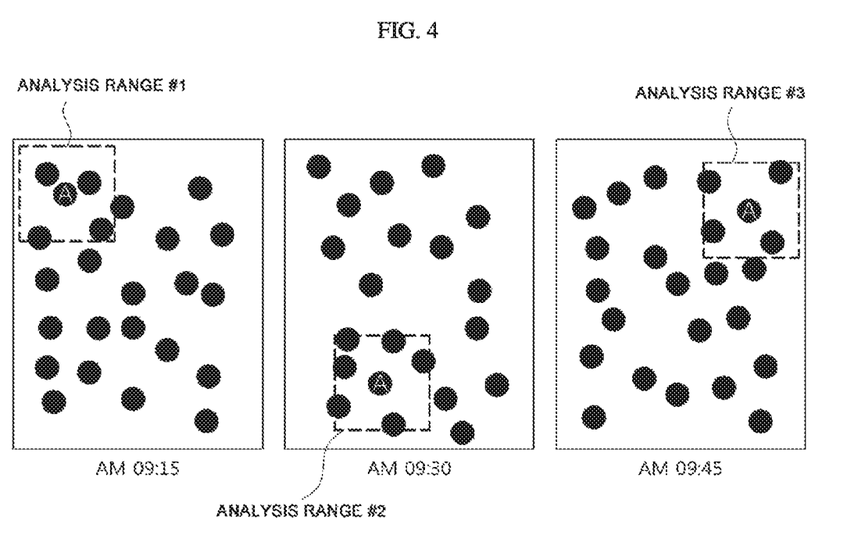
FIG. 4 is a diagram for describing an example of calculating an analysis range from the position information of the analysis target by the analysis range calculator according to an exemplary embodiment of the present disclosure.

FIG. 4 is a diagram for describing an example of calculating the analysis range from the position information of the analysis target by the analysis range calculator 102 according to an exemplary embodiment of the present disclosure. In the exemplary embodiment shown, an example of calculating each of an analysis range #1, an analysis range #2, and an analysis range #3 using the position information of the analysis target A of each time extracted by the process shown in FIG. 3 is illustrated.

In step 208, the analysis range calculator 102 may recognize the number of all personal identifiers included in each analysis range calculated in step 206. In this case, for example, even when the analysis target is fixed at a specific position and the position information extracted in step 204 is not changed, when remaining identifiers excluding the analysis target included in the analysis range are different, a separate characteristic analysis range is determined. The number of the identifiers of each analysis range may be used when calculating reliability by the image analyzer 104 which will be described hereinafter.

In the exemplary embodiment of FIG. 4 described above, the number of identifiers located in the analysis range #1 is 5, the number of identifiers located in the analysis range #2 is 7, and the number of identifiers located in the analysis range #3 is 5.

Next, the image analyzer 104 may identify one or more objects from image data corresponding to each analysis range derived by the analysis range calculator 102, and analyze one or more characteristics from each identified object. In one exemplary embodiment, the personalized characteristic analysis system 100 may include a separate image database (not shown) together with the positioning database. The image database may be configured to collect image data from one or more image capturing devices (a camera or a CCTV, etc.) arranged in a target analysis space, and store and manage the collected image data. Further, the personalized characteristic analysis system 100 may be configured to receive the image data from an external image database by being connected to a wired or wireless network, like the positioning database.

Figure 5:
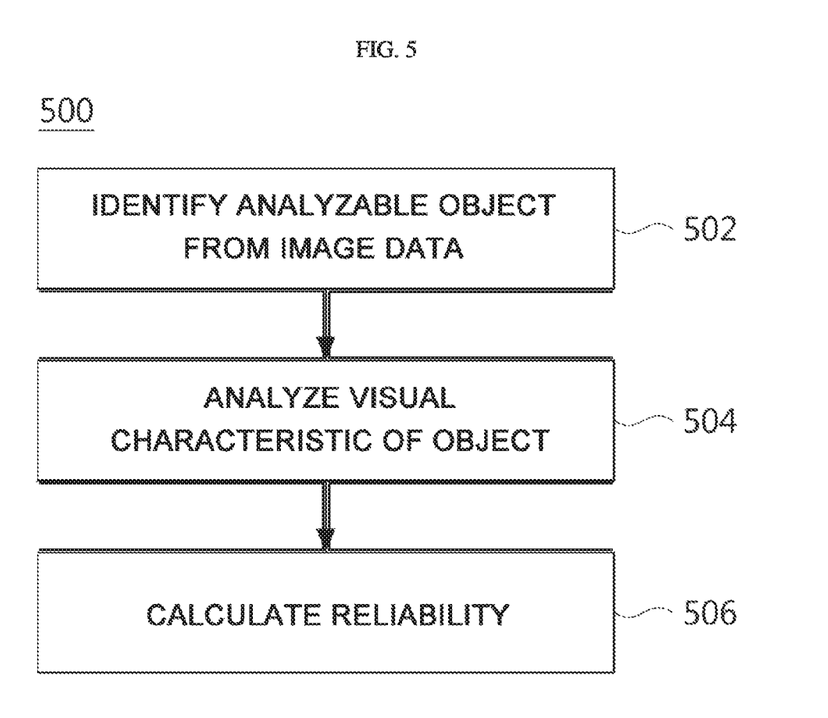
FIG. 5 is a flowchart for describing an image analysis process of an image analyzer according to an exemplary embodiment of the present disclosure.

FIG. 5 is a flowchart for describing an image analysis process 500 of the image analyzer 104 according to an exemplary embodiment of the present disclosure.

In step 502, the image analyzer 104 may identify an analyzable object from the image data corresponding to each analysis range. The image analyzer 104 may be configured to receive an image corresponding to each analysis range and analysis time from the image database, and extract the analyzable object from the received image. In this case, the object may be a person included in a corresponding image.

Meanwhile, there may be a range in which there is no image data among the analysis ranges calculated by the analysis range calculator 102 according to a capturing angle and an arrangement form of each image capturing device, or characteristics (whether there is a structure, furniture, a wall, etc.) of the target analysis space.

Figure 6:
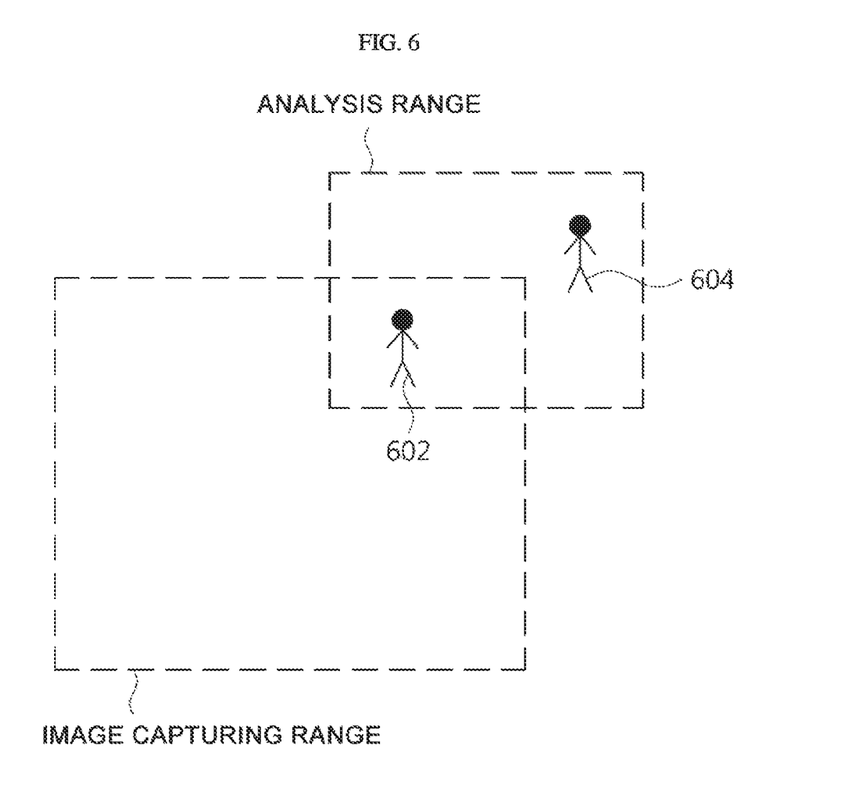
FIG. 6 is a diagram for describing an example case in which an image capture range and an analysis range are not matched in the image analysis of the image analyzer 104 according to an exemplary embodiment of the present disclosure.

FIG. 6 is a diagram for describing a case in which an image capture range and an analysis range are not matched in the image analysis process of the image analyzer 104 according to an exemplary embodiment of the present disclosure. As shown, when the image capturing range does not include every analysis range, the analysis range may be divided into a region in which there is image data and a region in which there is no image data. In this case, an object 602 of the region in which there is image data may be analyzed through the image data, but an object 604 of the region in which there is no image data may not be analyzed through the image data. That is, in this case, the number of identifiers of the analysis range recognized by the analysis range calculator 102 may be different from the number of the objects identified from the image data.

In step 504, the image analyzer 104 may analyze a visual characteristic of each identified object. In an exemplary embodiment, the characteristic of the object analyzed by the image analyzer 104 may include all kinds of information which may be estimated from an appearance of the object such as sex, age, race, height, whether handicapped, income level by belongings, etc. The image analyzer 104 may analyze the characteristic of each object using various kinds of image analysis algorithms, etc., since details related thereto are well known to a person having an ordinary skill in the art, a detailed description will be omitted herein.

In step 506, the image analyzer 104 may calculate reliability of a characteristic analysis result of each analysis range. In an exemplary embodiment, the reliability may be calculated using the number of all of the personal identifiers included in each analysis range, and the number of objects identified from the image data of each analysis range. In detail, the reliability may be obtained from a value obtained by dividing the number of objects identified from the image data of each analysis range by the number of personal identifiers recognized in a corresponding analysis range.

For example, suppose that the number of personal identifiers calculated by the analysis range calculator 102 is 2 and the number of objects identified from the image data is also 2 in the characteristic analysis range. In this case, when the image analysis result of each object is represented by the following Table 1, the reliability of the characteristic analysis result in the corresponding analysis range is represented by the following Table 2.

TABLE 1

| Age | Sex |
|---|---|
| 20s | Male |
| 20s | Female |

TABLE 2

| Classification | Characteristic | Reliability |
|---|---|---|
| Age | 20s | 100% |
| Sex | Male | 50% |
| Sex | Female | 50% |

That is, when the number of personal identifiers and the number of objects are within the same analysis range, the sum of the reliability of each classification (age, sex, etc.) may be 100%.

When the number of personal identifiers is not 2 but 4 in the example described above, the reliability of the characteristic analysis result in the corresponding analysis range is represented by the following Table 3.

TABLE 3

| Classification | Characteristic | Reliability |
|---|---|---|
| Age | 20s | 50% |
| Sex | Male | 25% |
| Sex | Female | 25% |

The reliability in the analysis range may show a probability in which an error is generated when analyzing the characteristic information by the characteristic analyzer 106. In the example described above, since two of the four identifiers identified in the analysis range are not visually recognized and the analysis is impossible, the sum of the reliability of each classification in the corresponding range may be decreased by 50% (=2/4).

Referring to FIG. 1 again, the characteristic analyzer 106 may derive personalized characteristic information of the analysis target using the characteristic analysis result of each analysis range obtained by the image analyzer 104. In detail, the characteristic analyzer 106 may receive a characteristic recognition requirement condition from a user, and generate a characteristic index of an analysis target corresponding to a corresponding requirement condition. In exemplary embodiments of the present disclosure, the characteristic index may be obtained by creating probabilities of one or more piece of the characteristic information of the analysis target using the analysis result obtained by the image analyzer 104 as indexes.

Figure 7:
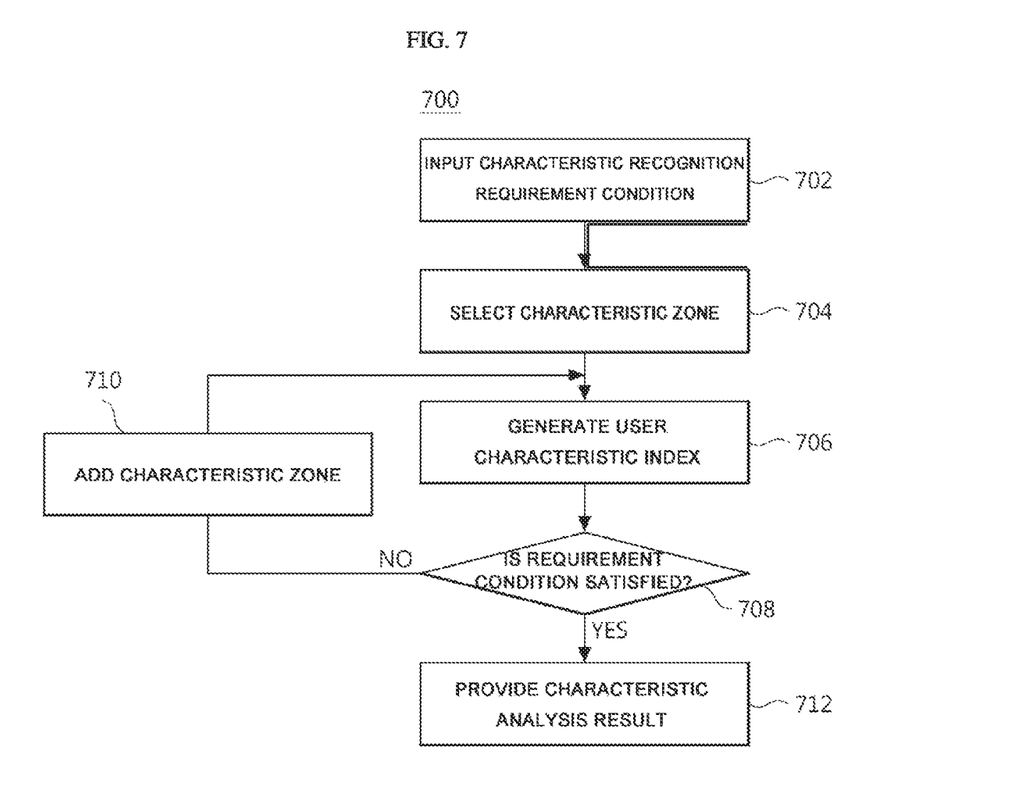
FIG. 7 is a flowchart for describing a characteristic analysis process of a characteristic analyzer according to an exemplary embodiment of the present disclosure.

FIG. 7 is a flowchart for describing a characteristic analysis process 700 of the characteristic analyzer 106 according to one exemplary embodiment of the present disclosure.

In step 702, the characteristic analyzer 106 may receive a characteristic recognition requirement condition from a user requesting analysis. The characteristic recognition requirement condition may include one or more characteristic classifications (sex, age, etc.) to investigate with respect to the analysis target.

The characteristic recognition requirement condition may be variably configured depending on a desired utilization purpose for the characteristic analysis result. For example, a user may simply want to recognize only the age of an analysis target when desiring to use the characteristic analysis result for alcoholic beverages advertising or tobacco advertising, etc. Further, only sex information of an analysis target may be needed for ladies' advertising. Of course, it may be necessary to recognize all combined characteristics such as sex, age, race, height, whether handicapped, etc., according to a situation. For example, when advertising clothing for women in their 50s, both sex information and age information of an analysis target may be needed.

In step 704, the characteristic analyzer 106 may select one or more analysis ranges among a plurality of analysis ranges as a characteristic zone. The characteristic zone may be determined according to the reliability of the analysis result of each analysis range calculated by the image analyzer 104. In one exemplary embodiment, the characteristic analyzer 106 may select only the analysis range in which the reliability is 100% as the characteristic zone. When configured as described above, uncertainty which may be generated due to an object in which an identifier is recognized to exist when calculating the analysis range but the analysis is impossible may be removed. Further, according to the exemplary embodiment, even when the reliability does not reach 100%, the characteristic analyzer 106 may be configured to select the analysis range which is equal to or more than a predetermined reference value (for example, 80%) as the characteristic zone.

In step 706, the characteristic analyzer 106 may generate personalized characteristic information (a characteristic index) of the analysis target from the characteristic analysis result corresponding to each of the selected characteristic zones. In detail, the characteristic analyzer 106 may derive the characteristic index using a common characteristic of the analysis target obtained from at least one portion among the characteristic analysis results of each characteristic zone.

In step 708, the characteristic analyzer 106 may determine whether a probability value of each characteristic included in the derived characteristic index satisfies a reference value (a requirement condition). For example, the characteristic analyzer 106 may determine that the probability value satisfies the reference value when the probability value of the characteristic index is 80% or more, and if not, determine that the probability value does not satisfy the reference value.

Based on the determination result of step 708, when the probability value does not satisfy the reference value, the characteristic analyzer 106 may add the characteristic analysis result of a new characteristic zone, and update the characteristic index in step 710. That is, the characteristic analyzer 106 may recalculate the common characteristic by increasing the number of the characteristic analysis results of each characteristic zone used to derive the common characteristic until a desired result is obtained.

By contrast, based on the determination result in step 708, when the probability value satisfies the reference value, the characteristic analyzer 106 may provide the generated characteristic analysis result (the characteristic index) to the user in step 712.

An example of the characteristic analysis process 700 of the characteristic analyzer 106 described above will be described below.

For example, suppose that the characteristic recognition requirement condition on the analysis target A is age and sex, and the image data analysis results of the analysis range #1, the analysis range #2, and the analysis range #3 shown in FIG. 4 are represented by the following Tables 4 to 6, respectively.

TABLE 4

| NO. | Age | Sex |
|---|---|---|
| 1 | 10s | Male |
| 2 | 20s | Male |
| 3 | 20s | Female |
| 4 | 40s | Female |
| 5 | 20s | Female |

TABLE 5

| NO. | Age | Sex |
|---|---|---|
| 1 | 20s | Male |
| 2 | 20s | Male |
| 3 | 30s | Male |
| 4 | 20s | Female |
| 5 | 20s | Female |
| 6 | 50s | Female |
| 7 | 60s | Female |

TABLE 6

| NO. | Age | Sex |
|---|---|---|
| 1 | 10s | Male |
| 2 | 30s | Male |
| 3 | 20s | Female |
| 4 | 20s | Female |
| 5 | 50s | Female |

Suppose that the analysis ranges #1 to #3 are characteristic zones in which the number of identifiers and the number of objects included in the image data are the same.

First, the characteristic index of the analysis target A is represented by the following Table 7 using information of the characteristic zone #1 shown in Table 4.

TABLE 7

| Characteristic Index #1 | | | |
|---|---|---|---|
| NO. | Age | Sex | Probability |
| 1 | 10s | Male | 20% |
| 2 | 20s | Male | 20% |
| 3 | 20s | Female | 40% |
| 4 | 40s | Female | 20% |

According to the information of Table 4, since the number of objects that are female and in their 20s is 2 and the number of each of the remaining objects is 1, a probability in which the analysis target A is a female in her 20s is 40% at most when considering only the characteristic index #1. However, the calculated probability is too low to determine the characteristic of the analysis target A using only the results. Accordingly, the characteristic analyzer 106 may generate the characteristic index #2 by extracting a common characteristic of the information of the characteristic index #1 and the characteristic zone #2.

First, when extracting the common characteristic of the information of the characteristic index #1 and the characteristic zone #2, the common characteristic is represented by the following Table 8.

TABLE 8

| NO. | Age | Sex |
|---|---|---|
| 1 | 20s | Male |
| 2 | 20s | Female |
| 3 | 20s | Female |
| 4 | 20s | Male |
| 5 | 20s | Male |
| 6 | 20s | Female |
| 7 | 20s | Female |

The characteristic index #2 shown in the following Table 9 may be derived from Table 8.

TABLE 9

| Characteristic Index #2 | | | |
|---|---|---|---|
| NO. | Age | Sex | Probability |
| 1 | 20s | Male | 43% |
| 2 | 20s | Female | 57% |

When calculating the characteristic index #2 using the common characteristic (intersection) of the characteristic index #1 and the characteristic zone #2, the analysis target A may show a probability of a male in his 20s as 43% (=3/7) and a probability of a female in her 20s as 57% (=4/7). However, since the probability in which the analysis target A is in its 20s is 100% in any case, when only age information of the analysis target A is needed, no further analysis may be needed.

However, when sex information of the analysis target A is additionally needed, it may be difficult to confirm the sex of the analysis target A from only the result of Table 8. Accordingly, the characteristic analyzer 106 may generate a characteristic index #3 as shown in the following Table 10 by extracting the common characteristic of the information of the characteristic index #2 and the characteristic zone #3.

TABLE 10

| Characteristic Index #3 | | | |
| --- | --- | --- | --- |
| NO. | Age | Sex | Probability |
| 1 | 20s | Female | 100% |

Referring to the characteristic index #3, it may be known that the analysis target A is a female in her 20s. The characteristic analyzer 106 may generate the characteristic index while adding information of the characteristic zone until a desired characteristic with respect to the analysis target is obtained.

Figure 8:
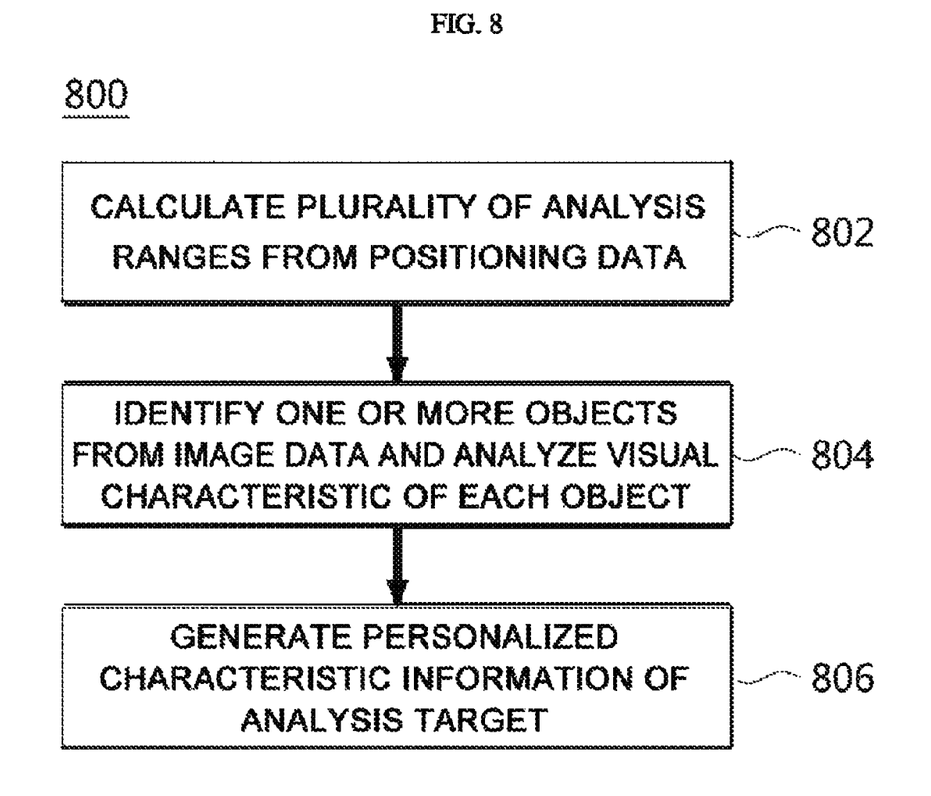
FIG. 8 is a flowchart for describing a method for analyzing a personalized characteristic according to an exemplary embodiment of the present disclosure.

FIG. 8 is a flowchart for describing a method for analyzing a personalized characteristic 800 according to one exemplary embodiment of the present disclosure. For example, the method shown in FIG. 8 may be performed by the personalized characteristic analysis system 100 described above. In the flowchart shown, the method is described by being divided into a plurality of steps, but at least one portion of the steps may be performed by changing the order, be performed by being combined with another step, be omitted, be performed by being divided into sub-steps, or be performed by adding one or more steps which are not shown.

In step 802, the analysis range calculator 102 may calculate a plurality of analysis ranges having different analysis times from positioning data according to a lapse of time of an analysis target.

In step 804, the image analyzer 104 may identify one or more objects from image data corresponding to each analysis range, and analyze one or more visual characteristics from each of the identified objects.

In step 806, the characteristic analyzer 106 may generate personalized characteristic information of the analysis target using a characteristic analysis result of each analysis range.

Meanwhile, an exemplary embodiment of the present disclosure may include a program for executing in a computer, and a computer-readable recording medium including the program. The computer-readable recording medium may include a program instruction, a local data file, a local data structure, etc. alone or in combination. The computer readable recording medium may be specially designed and configured for the present disclosure, or may be a medium which is generally used in the computer software field. Examples of the computer-readable recording medium may include a hard disk, a magnetic media such as a floppy disk and a magnetic tape, an optical recording media such as a compact disk read-only memory (CD-ROM) and a digital video disk (DVD), a magneto-optical media such as a floptical disk, and a hardware device which is specially configured to store and execute a program instruction such as ROM, random access memory (RAM), flash memory, etc. Examples of the program instruction may include not only machine code made by a compiler, but also high-level language code which is executable by a computer using an interpreter, etc.

According to exemplary embodiments of the present disclosure, various personalized characteristics of an analysis target can be precisely recognized through a combined analysis of positioning data and image data of the analysis target.

While the exemplary embodiments of the present disclosure are described in detail above, it will be understood by those of ordinary skill in the art that various changes and modifications in form and details may be made therein without departing from the spirit and scope as defined by the following claims. Accordingly, the scope of the present disclosure is not limited by the exemplary embodiments of the present disclosure, it is intended that the present disclosure covers all such modifications and changes of those of ordinary skill in the art derived from a basic concept of the appended claims, and their equivalents.

What is claimed is:

1. A system for analyzing a personalized characteristic, comprising:
    an analysis range calculator that calculates a plurality of analysis ranges having different analysis times from positioning data according to lapse of time of an analysis target;
    an image analyzer that identifies one or more objects from image data corresponding to each of the analysis ranges, and analyze one or more visual characteristics from each of the identified objects; and
    a characteristic analyzer that generates personalized characteristic information of the analysis target using a characteristic analysis result of each of the analysis ranges,
    wherein the image analyzer calculates reliability of the characteristic analysis result of each of the analysis ranges, and
    wherein the characteristic analyzer selects one or more characteristic zones among the analysis ranges using the reliability, and generates the personalized characteristic information of the analysis target from the characteristic analysis result corresponding to each of the characteristic zones.

2. The system of claim 1, wherein the analysis range calculator calculates the analysis range by considering an error characteristic of a positioning means generating the positioning data.

3. The system of claim 2, wherein the analysis range calculator calculates the analysis range by additionally considering a characteristic of a space corresponding to the positioning data.

4. The system of claim 1, wherein the reliability is calculated using the number of all personal identifiers within each of the analysis ranges, and the number of objects identified from the image data of each of the analysis ranges.

5. The system of claim 1, wherein the characteristic analyzer selects an analysis range in which the reliability is equal to or more than a predetermined value among the analysis ranges as the characteristic zone.

6. The system of claim 1, wherein the characteristic analyzer sets a common characteristic of the analysis target derived from at least one portion of the characteristic analysis result of each of the characteristic zones as a personalized characteristic of the analysis target.

7. The system of claim 6, wherein the characteristic analyzer recalculates the common characteristic by increasing the number of the characteristic analysis results of each of the characteristic zones used to derive the common characteristic when a probability value corresponding to the derived common characteristic does not satisfy a reference value.

8. A method for analyzing a personalized characteristic, comprising:
    calculating a plurality of analysis ranges having different analysis times from positioning data according to lapse of time of an analysis target;

identifying one or more objects from image data corresponding to each of the analysis ranges, and analyzing one or more visual characteristics from each of the identified objects; and generating personalized characteristic information of the analysis target using a characteristic analysis result of each of the analysis ranges, wherein the analyzing of the one or more visual characteristics further comprises calculating reliability of the characteristic analysis result of each of the analysis ranges, and wherein the generating of the personalized characteristic information selects one or more characteristic zones among the analysis ranges using the reliability, and generates the personalized characteristic information of the analysis target from the characteristic analysis result corresponding to each of the characteristic zones.

9. The method of claim 8, wherein the calculating of the plurality of analysis ranges calculates the analysis range by considering an error characteristic of a positioning means generating the positioning data.

10. The method of claim 9, wherein the calculating of the plurality of analysis ranges calculates the analysis range by additionally considering a characteristic of a space corresponding to the positioning data.

11. The method of claim 8, wherein the reliability is calculated using the number of all personal identifiers within each of the analysis ranges, and the number of objects identified from the image data of each of the analysis ranges.

12. The method of claim 8, wherein the generating of the personalized characteristic information selects an analysis range in which the reliability is equal to or more than a predetermined value among the analysis ranges as the characteristic zone.

13. The method of claim 8, wherein the generating of the personalized characteristic information sets a common characteristic of the analysis target derived from at least one portion of the characteristic analysis result of each of the characteristic zones as a personalized characteristic of the analysis target.

14. The method of claim 13, wherein the generating of the personalized characteristic information recalculates the common characteristic by increasing the number of the characteristic analysis results of each of the characteristic zones used to derive the common characteristic when a probability value corresponding to the derived common characteristic does not satisfy a reference value.

15. A non-transitory computer readable storage medium having stored thereon a program, which when executed by a computer, performs a method comprising:

calculating a plurality of analysis ranges having different analysis times from positioning data according to a lapse of time of an analysis target;

identifying one or more objects from image data corresponding to each of the analysis ranges, and analyzing one or more visual characteristics from each of the identified objects; and generating personalized characteristic information of the analysis target using a characteristic analysis result of each of the analysis ranges, wherein the analyzing of the one or more visual characteristics further comprises calculating reliability of the characteristic analysis result of each of the analysis ranges, and wherein the generating of the personalized characteristic information selects one or more characteristic zones among the analysis ranges using the reliability, and generates the personalized characteristic information of the analysis target from the characteristic analysis result corresponding to each of the characteristic zones.

* * * * *